Figure 1:
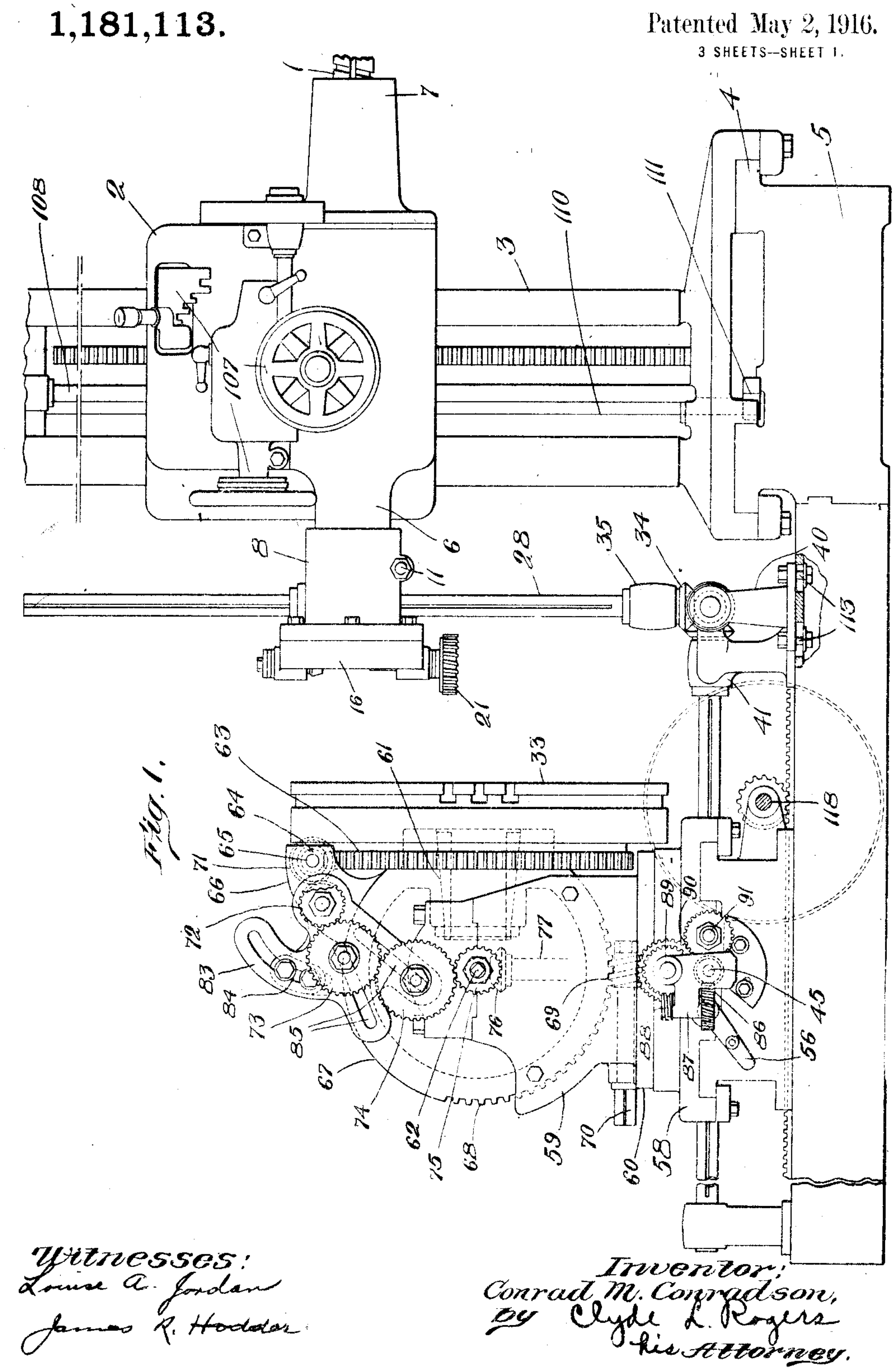

C. M. CONRADSON.

METAL WORKING MACHINE.

APPLICATION FILED AUG. 16, 1912.

1,181,113. Patented May 2, 1916.

3 SHEETS—SHEET 1.

Witnesses:
Louise A. Jordan
James R. Hodder

Inventor;
Conrad M. Conradson,
by Clyde L. Rogers
his Attorney.

C. M. CONRADSON.
METAL WORKING MACHINE.
APPLICATION FILED AUG. 16, 1912.

1,181,113. Patented May 2, 1916.

3 SHEETS—SHEET 2.

Witnesses:
Louise A. Jordan
James R. Hodder

Inventor:
Conrad M. Conradson,
By Clyde L. Rogers
his Attorney.

C. M. CONRADSON.
METAL WORKING MACHINE.
APPLICATION FILED AUG. 16, 1912.

1,181,113.

Patented May 2, 1916.

3 SHEETS—SHEET 3.

Witnesses:
Louise A. Jordan
James R. Hodder

Inventor:
Conrad M. Conradson,
by Clyde L. Rogers
his Attorney

UNITED STATES PATENT OFFICE.

CONRAD M. CONRADSON, OF MADISON, WISCONSIN, ASSIGNOR, BY MESNE ASSIGNMENTS, TO LANDIS TOOL COMPANY, OF WAYNESBORO, PENNSYLVANIA, A CORPORATION OF PENNSYLVANIA.

METAL-WORKING MACHINE.

1,181,118. Specification of Letters Patent. Patented May 2, 1916.

Application filed August 16, 1912. Serial No. 715,460.

*To all whom it may concern:*

Be it known that I, CONRAD M. CONRADSON, a citizen of the United States, and resident of Madison, in the county of Dane and State of Wisconsin, have invented an Improvement in Metal-Working Machines, of which the following description, in connection with the accompanying drawings, is a specification, like letters on the drawings representing like parts.

My present invention relates to metal-working machines, and especially to a type of machine adapted to present an operative tool to the work at any desired angle and with any desired direction of feed movement.

To this end, in its more complete embodiment the invention comprises a milling cutter with its axis mounted for angular adjustment and for feed movement in different planes, in conjunction with a universally adjustable work-table, likewise having feeding movements in different directions. In one more specific aspect and in the embodiment herein shown, the milling cutter on its angularly adjustable axis is formed as an attachment adapted to be quickly and easily applied to a multiple-use machine of the horizontal boring mill type and as set forth in my Patent No. 1,121,714, patented December 22, 1914. In such application of this feature of the invention, the milling cutter attachment, which is normally vertical but capable of adjustment to any desired angle, serves to still further widen and extend the field of use of the machine to which it is applied, adapting the machine to perform not only the ordinary milling operations for which the machine is adapted by the fixing of a milling cutter to the main tool bar, along with the boring, drilling, slotting, tapping, etc., operations for which it is adapted as set forth in my said prior application, but also those special kinds of milling operations which are best performed by a vertical or angularly set miller. The improved vertical milling attachment is thus a valuable and important feature of novelty as an adjunct to the mechanism of the multiple-use machine, even when used with an ordinary work table, and it is quickly detachable so that the machine can be applied to its ordinary uses or converted into a vertical miller at short notice. The vertical and angularly adjustable milling attachment has, however, a further special and important field of utility in its coöperation with the universal work table, which constitutes therewith a mechanism for presenting the work at any angle whatsoever with reference to the tool that may be desired, and with a feed or traversing movement in any direction requisite for the performance of any particular or special work. I therefore summarize as important features of my invention:—the vertical and angular milling device as an attachment to the organized machine; the combination of such milling device, whether used as an attachment or not, with the universal work table connected up for coöperating therewith; and such universal work table in its coöperative and combined relation to the organized multiple-use machine, whether having the vertical milling attachment connected thereto or not.

The invention will be better understood from the following detailed description, taken in connection with the accompanying drawings, and will be thereafter pointed out in the appended claims.

Figures 2, 6:
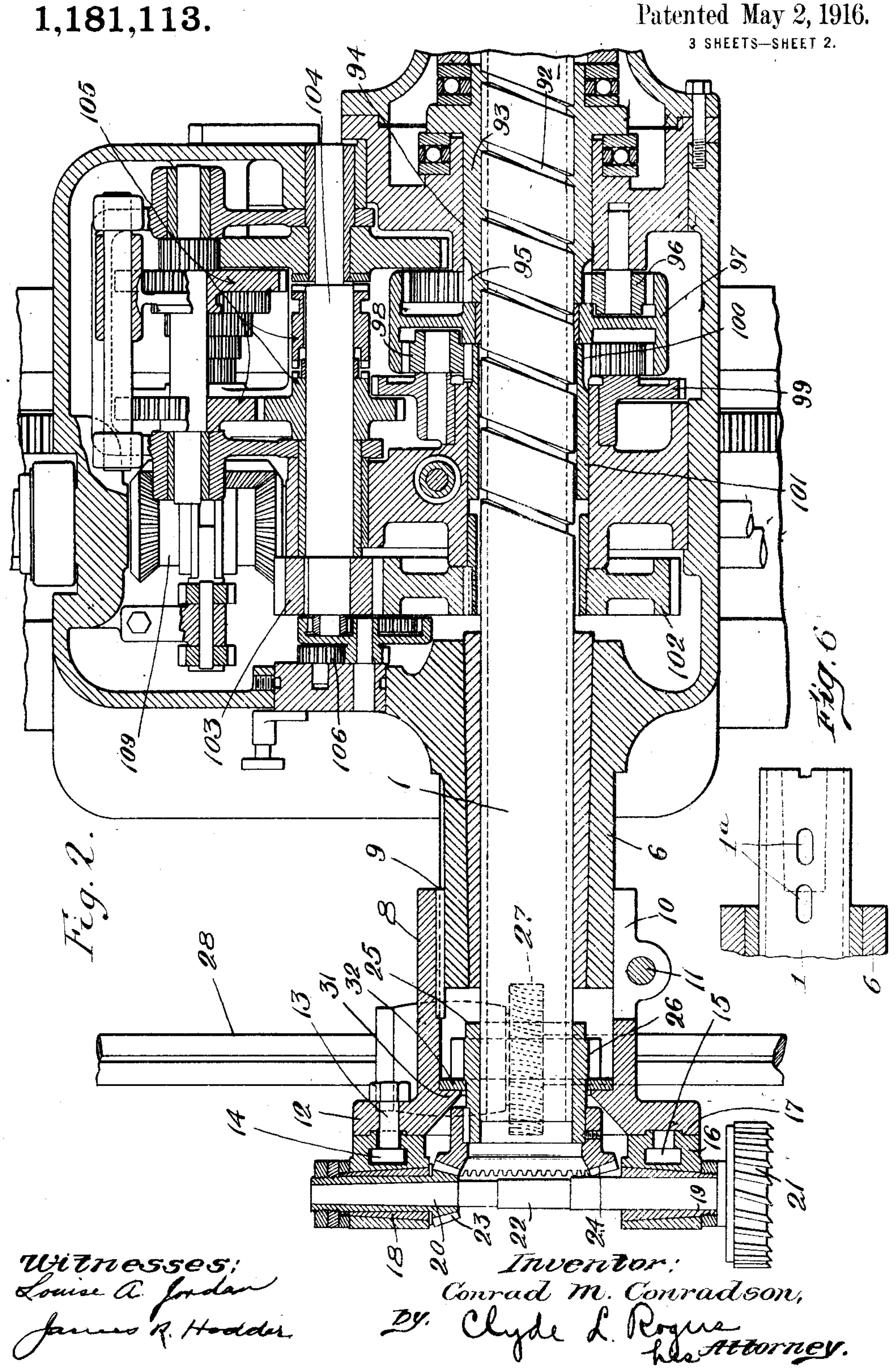
Figures 3, 4, 5:
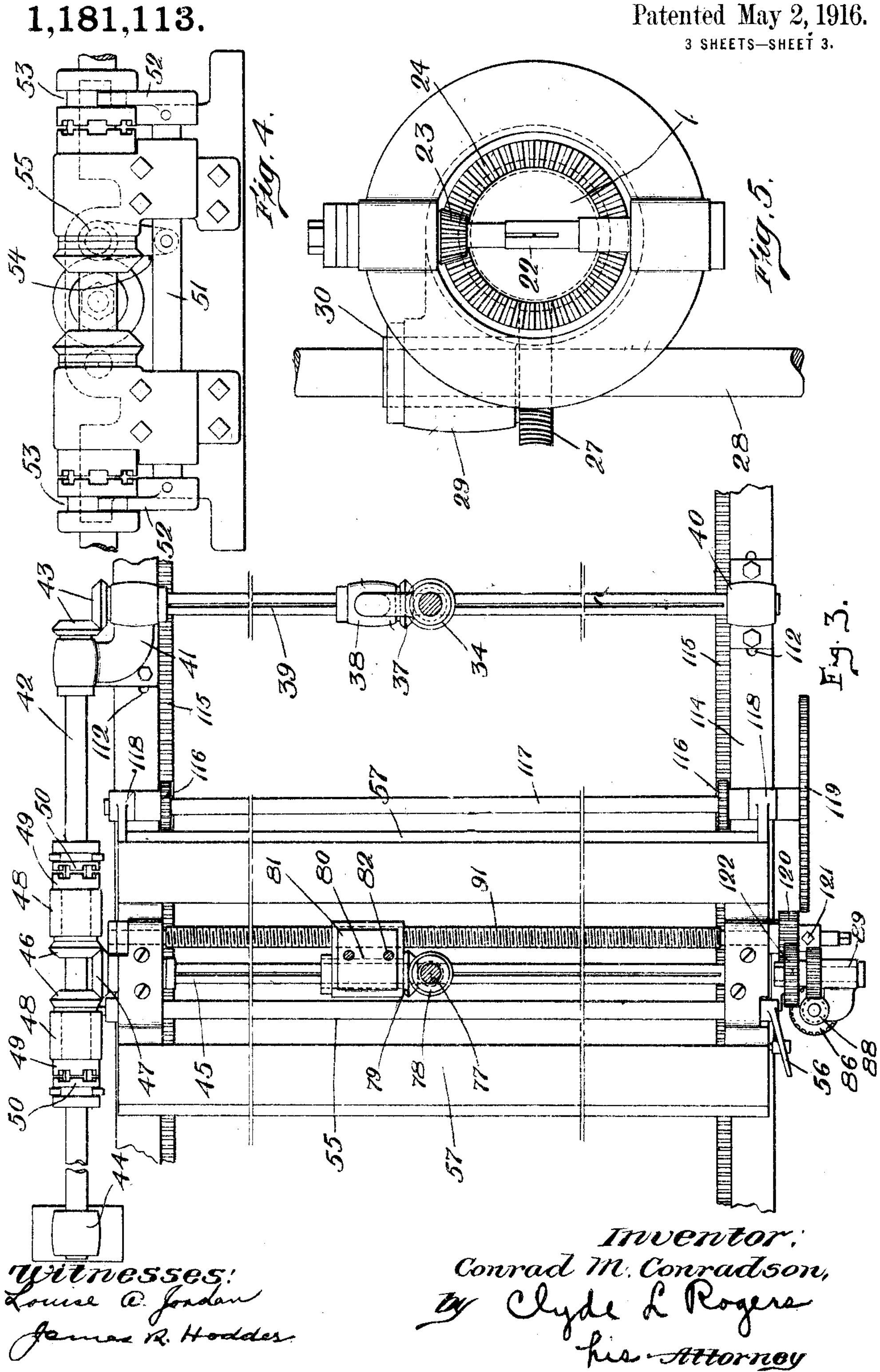

Referring to the drawings, Figure 1 is a side elevation of a machine wherein my improvements are embodied; Fig. 2 is a central vertical section through the saddle and showing the milling attachment in place, parts being broken away; Fig. 3 is a plan view showing the gearing connections to the work table; Fig. 4 is a side view of certain driving connections to the work table; Fig. 5 is an end view of the milling attachment, the vertical shaft connected therewith being broken away; and Fig. 6 is a fragmentary detail of the end of the tool spindle and its mounting with the angular milling attachment removed.

The tool bar or spindle 1, in like manner as in my said prior application, is mounted in a saddle or support 2 for rotation and endwise movement in variable ratios or for either movement without the other, and the saddle 2 is slidably mounted on spaced-apart ways on an upright column 3 with operative connections for traversing and power feed movements. The outer end of the tool spindle 1 is suitably slotted and socketed as seen at $1^a$ to receive a cutter head directly thereon when desired. The column 3 is likewise mounted on spaced-apart horizontal ways 4 on the bed 5, with operative connections for traversing and power feeding the same across said bed at will, all as more fully described later and set forth in further specific detail in my said prior application. The saddle or tool support 2 is provided with projecting sleeve or collar bearings 6, 7 at its opposite sides to afford widely separated bearing supports for the tool spindle or bar 1, as in my said earlier machine, but in the present case the inner bearing sleeve or collar 6 serves a further purpose of a support and carrier for the vertical and angular milling attachment which forms an important feature of the present invention. For this purpose, the sleeve bearing 6 is preferably extended to somewhat greater length than it would ordinarily have for its spindle-bearing function alone, and it has mounted thereon for endwise sliding adjustment a sleeve 8, this sleeve being shown as held from turning on the bearing sleeve 6 by a key-and-groove connection 9 and adapted to be securely clamped in adjusted position by being slitted for a distance from its end, as seen at 10, and drawn together in clamped engagement with the sleeve 6 by a screw bolt 11.

The sleeve 8 has a circular flange 12 at its outer end through which is passed a series of clamp bolts 13 having their heads 14 fitted in an annular undercut slot 15 of the milling head 16, this head being shown as held in accurate guided relation to the flange 12 in its angular adjustments by annular interengaging portions 17 of these two members. The milling head 16 is provided with spaced-apart bearings 18, 19 for the shaft 20 of a milling cutter, this shaft being shown as fitted in bearing bushings and held from endwise displacement in usual manner by backing washer and nut devices. The shaft 20 is adapted to carry a milling or facing head 21 at its end, and it is also preferably provided with a seat 22 centrally between its bearings to receive a cutter which may be a milling cutter in alinement with its axis of angular adjustment. Driving impulse is imparted to shaft 20 by a bevel pinion 23 fixed thereto and in driven engagement with a bevel gear 24 fixed at the end of a sleeve 25. The sleeve 25 is detachably fixed for rotation with the tool spindle 1 at its end, in any suitable manner, for instance, by having a key engaged in the key way of the spindle and in addition to carrying the gear 24 also has fixed thereto or formed therewith a spiral gear 26 in driving engagement with a mating spiral gear 27 slidably splined on a vertical shaft 28, this gear being held in a bracket extension 29 from the sleeve 8 by having a hub 30 formed therewith journaled in such bracket. The sleeve 8 as shown is provided with an inwardly extending flange 31 engaged by a washer 32 which coöperates to hold the gear sleeve 25 from longitudinal displacement relative to the sleeve 8 and the parts carried thereby. It will be observed that the sleeve 8 is considerably longer than would be necessary for its function of holding the milling attachment in place and the purpose of this added length is to permit a substantial degree of in and out adjustment of the milling attachment relative to the saddle, the extra length of the sleeve 6 coöperating to this end and thus the milling attachment can be adjusted out at will so as to have a considerable degree of overhang from the saddle to better engage work pieces on the table under special conditions. In such outward adjustment of the milling attachment the tool spindle 1 may of course be adjusted outward accordingly by the mechanism which moves it endwise in other uses.

The vertical shaft 28 which as explained receives driving impulse from the spindle 1 through the spiral gears 26, 27 is connected to control the rotating traversing and feed movements of the universal table 33 and for this purpose a bevel pinion 34 having a journal bearing 35 carried by a bracket 36 is fixed at the lower end of said shaft and drives a bevel pinion 37 also having a journal bearing 38 carried by the bracket 36 which bracket is fixed at the base of the column 3. The pinion 37 is slidably splined to a horizontal shaft 39 extending across the machine and journaled at its end in bearing blocks 40, 41. The bearing block 41 also furnishes bearing for one end of the shaft 42 which extends outward along one side of the bed at right angles to the shaft 39 which is in driving engagement therewith by means of bevel gears 43 carried in the block 41. The shaft 42 which has its outer end journaled in the bearing block 44 is adapted to drive a shaft 45 extending between the work table ways in either direction by means of bevel pinions 46 both in driving engagement with the bevel pinion 47 fixed on the end of shaft 45, the pinions 46 being loosely fitted on shaft 42 and journaled so as to be held against endwise movement in bearing blocks 48. The pinions 46 have clutch faces 49 rigid therewith and are adapted to be selectively connected with the shaft 42 to be driven thereby by means of coöperative clutch faces 50 slidably splined on the shaft 42 and connected to be simultaneously operated by a shifter bar 51 having forked prongs 52 engaging in annular grooves 53 formed with said clutch faces. The clutch faces 50 are held spaced apart by this means to distances so that both may be disengaged as seen in Fig. 4 and thus the shaft 45 freed from driving engagement or either of the pinions 46 may be connected so as to drive said shaft in the corresponding direction at will. The clutch controlling bar 51 is actuated by engagement with a swinging arm 54 carried by a rock shaft 55 extending across the machine and having an operating handle 56 at its outer end. The work table 33 is mounted on spaced-apart ways 57 for traversing and feed movement across the machine, having for this purpose a base portion 58 interengaged with said ways in usual manner. The base portion 58 has mounted a bracket support 59 provided with a flanged bottom 60 this bracket portion being angularly adjustable about a central vertical axis. The bracket support 59 is equipped with suitable horizontal bearings to permit adjustment of the journal support 61 of the table proper 33 about the horizontal axis 62, the table 33 being mounted to turn in its journal support 61. To effect such turning movement of the table 33 it has fixed thereto a gear rim 63 in driven engagement with a spiral pinion 64 on a shaft 65. The shaft 65 is journaled in a bracket extension 66 of a circular plate 67 fixed to the back of the work table and having gear teeth 68 about a part of its periphery engaged by the teeth of a spiral pinion 69 journaled in the bracket support 59 and having a squared end 70 to receive an adjusting tool. By this means the face of the table proper 33 can be set either vertically as seen in Fig. 1 or horizontally or at any desired angle between its vertical and horizontal positions; the plate backing 67 of the table journal support 61 for this purpose swinging about the axis 62. The shaft 65 also has fixed thereto a spur pinion 71 driven through an intermediate mating gear and shaft by a gear train 72, 73, 74, 75, from the shaft on the adjusting axis 62, such shaft having bevel pinion driving connection 76 with a vertical shaft 77 coaxial with the axis of adjustment of the bracket 59 and its base 60. The vertical shaft 77 has a bevel pinion 78 fixed at its bottom and in driving engagement with a similar pinion 79 splined on the shaft 45 and held to move with the table across the machine by having a sleeve extension 80 with a headed outer end journaled in a block 81 fixed beneath the base 58 which constitutes the work table support as by pin bolts 82; this spline connection of pinion 79 with the shaft 45 thus keeps said shaft in driving engagement with the table for rotating the same throughout the movement or adjustment of the table on the ways 57 across the machine. The intermediate gears 72, 73, 74, in the train which transmits driving impulse for turning the table are shown as mounted in a bracket 83 capable of swinging adjustment with an arcuate slot and bolt clamping means 84, an axis bolt adjustable lengthwise of a slot 85 permitting different sizes of pinions to be employed for altering the ratio of driving transmission at will or permitting reversal of direction of the table by employing one more or one less pinion. The shaft 45 also serves as a driving means for effecting a traverse or feed movement of the table across the machine and for this purpose it has driving connection at its extremity by means of worm or spiral gearing 86, stub shaft 87, worm gearing 88, stub shaft 89, and spur gearing 90 with a feed screw 91 extending across the machine and suitably journaled at its extremities; it will be understood that the stub shafts 87, and 89 are suitably journaled in brackets secured to the base and that the several members of the transmission gearing are properly fixed thereto. The feed screw 91 engages a nut portion formed on a depending extension from the table base 58, shown as the block 81 in which the pinion 79 is journaled and thus the work table may be adjusted or fed across the machine in any desired relation to the tool spindle or milling tool. The rate of this feeding movement can be varied at will by substituting for certain of the gears of the feeding screw drive train e. g. for the spur gears 90, others of different relative sizes.

It may now be understood that the described mounting and connections are adapted to present the face of the work table 33 with the work clamped thereon in any position whatsoever relative to the tool with a feed movement in any desired direction. The work table may be adjusted to proper position relative to the tool (whatever such tool mounted on or driven by the tool spindle 1 may be) by means of the feed movement of the table base 58 on the ways 57 and the work table then rotated for operative feed or adjusted angularly by the power driving connection operative to turn it in its journal bearing 61. Since the power actuated means for rotating the table can be instantly disconnected by throwing out the clutch elements 49, 50 it is evident that this driving connection can be utilized to bring the work to desired position. The capacity of the table on its bracket support 59 for the turning adjustment about the horizontal axis 62 by the gear segment 68 and pinion 69 makes it possible for the face of the table with the work thereon to be presented at any desired angle whatsoever relative to the tool bar, the driving connections for turning the table on its journal axis 61 by power remaining undisturbed and in operative relation throughout all such adjustments. This capacity for numerous and widely varied adjustments and movements of the work table in different directions becomes of special significance and importance when it is remembered that the tool bar or spindle 1 of the present machine in its more comprehensive embodiment is not merely a boring bar but a bar capable of moving a tool carried thereby in any direction. rotating a tool either at high or low speeds, with or without a variable accompaniment of endwise movement, reciprocating a tool such as a slotter without rotary movement, or rotating a tool while moving it bodily laterally. The described universal work table in combination and coöperative relation to such a multiple use tool bar enables the machine to render service not only for the usual machine shop operations but also for various and sundry special kinds of work for which even no ordinary commercial type special-work machine is adapted. In this connection it is to be noted that the work table is geared up in definite timed relation to the tool spindle drive, being operated therefrom by means of the vertical shaft 28 and the described connections so that when required the power movement of the table can be regulated in precise relation to the tool movement. While my improved universal power controlled work table thus has valuable and distinctive utilities for general uses and more specific utilities in conjunction and combination with a multiple use tool bar as set forth it has still further and more extended advantages and uses in connection with the vertical and angularly adjustable milling attachment which as explained can not only be angularly adjusted to any angle whatsoever but is also adjustable in and out on the bearing sleeve 6 so as to have any desired degree of "overhang" out from the saddle and is thus adapted to present a milling tool to attack the work from any direction and with any sort of a feed desired, the direction of feed movement being in any required direction, such direction being instantly changeable, as desirable for finishing curved surfaces on the work.

It is to be understood that my improved milling attachment is valuable and useful as an accessory of the machine with the multiple use tool bar whether or not it be employed in conjunction with a universal work table as set forth, though it has the described special utilities in connection with such work table.

The special means for imparting rotary and endwise movement at variable rates and ratios or one movement without the other, and bodily lateral movement by hand or power actuated means to the tool spindle form no part of the present invention and are specifically and fully set forth in my said prior application wherein they are duly claimed. The construction for effecting such movements is preferably similar to that of said application, the tool spindle 1 being shown as provided with a spiral groove 92 engaged by a nut 93 having independent bearing 94 in the saddle, this nut having one end equipped with gear teeth 95 meshing with pinions 96 of which there are usually three journaled in the saddle, these pinions also meshing with internal teeth at one side of a planetary gear 97, which has internal teeth at its other side meshing with pinions 98 which are carried on a gear 99 journaled in the saddle, the gear 99 being connected with the driving train for imparting endwise feed movements to the saddle. The pinions 98 are also in mesh with a gear 100 on the end of a driving sleeve 101 journaled in the saddle and splined to the tool bar at opposite sides thereof. Since the gears 95 and 100 are of the same size and since the pinions 96 and 98 are also of the same size it follows that with the gear 99 stationary, the feed sleeve 93 will turn with the tool spindle 1 and its drive sleeve 101, the planetary gear 97 then turning idly, and the tool spindle being rotated without endwise movement; as rotation is imparted to the gear 99 however it will through the pinons 98, gear 97 and pinions 96, transmit differential rotation to the feed sleeve 93 relative to the tool spindle 1 and hence by reason of the spiral groove engagement between these parts effect the endwise movement of the tool spindle along with its rotation, the rate of such endwise movement being determined by the speed at which the gear 99 is driven. It will be further seen that if the drive sleeve 101 be held stationary and the gear 99 rotated, the described connections will effect the endwise movement of the tool spindle without turning thereof, its rotation being prevented by its splined connection with the sleeve 101. The sleeve 101 is driven by a gear 102 engaged by a pinion 103 fixed on a shaft 104 which is reversibly and variably driven by a change and reverse gear system 105 which need not be further specifically described herein. The gear 99 is variably and reversibly rotated through a change gear system of which a portion is shown at 106. All these driving connections are preferably controlled from the saddle by controlling devices designated generally 107. The prime power shaft is shown as a vertical shaft 108 having reversible connections 109 to the various driven parts. This shaft through suitable connections is adapted to not only rotate and move endwise the tool spindle but it also operates to move the saddle vertically and also to move the column 3 along the bed 4, the latter movement being effected by vertical shaft 110 having a pinion at its lower end and engaging a rack 111 on the bed. The connections for moving the saddle on the column and for moving the column on the bed are preferably such as to permit either a rapid power traverse, a power feed at variable speeds or a hand adjustment at will, all as more fully set forth in my said prior application.

To permit adjustment of the lower end of shaft 25 along with the upper part thereof as the milling attachment is adjusted in and out on the nose or sleeve 64 I provide elongated slots 112 through which the clamping bolts 113 which affix the brackets 40, 41 to the nose extend and by loosening these bolts the brackets 40, 41 the gears, and shafts carried thereby may be moved to keep the shaft 25 vertical throughout adjustments of the milling attachment. Means is also preferably provided to move the work table and its supporting base in and out toward and from the column 5. To this end the work table base is slidable on ways 114 on the bed frame work and racks 115 at each side of the bed are engaged by pinions 116 fixed on a shaft 117 mounted in bearings 118 projecting out from the work table base. The shaft 117 has fixed at one end a large gear 119 adapted to mesh with the gear 120 slidably fixed on the outer end of the screw shaft 91 in one position thereof. The gear 120 is normally fixed to the screw shaft 91 as by a set bolt 121 in a position where it is out of mesh with the gear 119 but when it is desired to move the work table by power in or out toward and from the saddle the gear may be adjusted to mesh with the gear 119. It may also be adjusted further out so as to be entirely out of engagement with the gear 122 forming part of the gear train 90 by which it is driven. Thus by proper adjustment of the gear 120 both the screw 91 and the pinions 116 may be driven to simultaneously move the work table crosswise and lengthwise of the machine or either movement may be imparted without the other.

The unlimited capacity for presenting the work in any desired position relative to the tool which my invention in its more comprehensive embodiment affords, and the facility with which any of the ordinary metal working tools can be fitted to the tool bar 7 or the vertical and angularly adjustable milling attachment herein shown applied at will and a relative working feed in any required direction makes it possible to completely machine any piece of work after the same is once clamped to the work table without any re-chucking thereof thus effecting a large saving of time in this class of work. The details of construction as herein set forth may be varied in many particulars without departing from the spirit of the invention and I therefore do not desire to be limited as to these or in any other particulars except as set forth in the appended claims.

Having thus described my invention what I claim as new and desire to secure by Letters Patent is:

1. A machine of the kind described comprising an upright column, a saddle vertically movable thereon, a horizontal tool spindle [illegible] in said saddle for receiving a tool directly thereon and a vertical milling attachment having a mounting connected with [illegible] supported by said saddle and [illegible] to be connected with and driven by said spindle.

2. A machine of the kind described comprising an upright column, a saddle vertically movable thereon, a horizontal tool spindle mounted for rotation and endwise movement in said saddle adapted to receive a tool directly thereon and a vertical milling attachment having provision to receive support from said saddle with gear connections adapted to be detachably attached to the end of said spindle to be driven thereby.

3. A machine of the kind described comprising an upright column, a saddle vertically movable thereon, a horizontal tool spindle mounted for rotation and endwise movement in said saddle with driving connections for effecting said movements, and a vertical milling attachment having provision to receive support from said saddle and mounted for adjustment toward and away therefrom, said attachment having gear connections adapted to be detachably engaged with the end of said tool spindle to drive a milling tool.

4. A machine of the kind described comprising a vertical column, a saddle movable up and down thereon, a horizontal tool spindle mounted for rotation and endwise movement in said saddle with driving connections for effecting said movements and a vertical milling attachment having provision to receive support from said saddle at one side, said attachment having a horizontally arranged gear detachably connected to the end of said tool spindle and a vertical shaft carrying a milling tool in driven engagement therewith.

5. A machine of the kind described comprising an upright column, a saddle vertically movable thereon, a horizontal tool spindle mounted [illegible] of said saddle [illegible] the spindle [illegible] said tool spindle [illegible] and a milling tool carried thereby.

6. A machine of the kind described comprising an upright column, a saddle vertically movable thereon, [illegible] with said bearing [illegible] rying shaft [illegible] ment, said shaft having [illegible]

with said spindle adapted to remain in operative position throughout the range of adjustments.

7. A machine of the kind described comprising a spindle adapted to directly receive a tool, a mounting therefor permitting rotary and endwise movements of said spindle, with spaced apart bearings therefor, one of said bearings being formed as a projecting sleeve, a milling attachment having a sleeve fitted over said bearing sleeve, with a cutter shaft mounted transverse of said tool spindle with provision for angular adjustment relative thereto, and driving connections from said spindle to said cutter shaft arranged to remain in engagement throughout the range of adjustment of said shaft.

8. A machine of the kind described comprising an upright column, a saddle vertically movable thereon, a tool spindle mounted for rotary and endwise movement in said saddle, a milling cutter mounted on an axis at right angles to said saddle, said cutter with its mounting being formed to be applied as an attachment to said saddle to be supported thereby, and said cutter having provision to be driven from said spindle.

9. A machine of the kind described comprising an upright column, a saddle vertically movable thereon, a tool spindle mounted for rotary and endwise movement in said saddle, and a milling cutter mounted on an axis transverse of said spindle, the mounting of said cutter being formed as an attachment to be applied to said saddle, and supported therefrom with provision for in and out adjustment of the cutter axis relative to the saddle, and said cutter having driving connection with said tool spindle.

10. A machine of the kind described, comprising an upright column, a saddle vertically movable thereon, a tool spindle mounted for rotation and endwise movement in said saddle for receiving a tool directly thereon, and a vertical milling attachment mounted for operative connection with said saddle and said tool spindle and arranged to receive driving impulse from said spindle.

In testimony whereof, I have signed my name to this specification, in the presence of two subscribing witnesses.

CONRAD M. CONRADSON.

Witnesses:

FLORENCE B. SPENSLEY,

ARTHUR F. RANDALL.